United States Patent
Moore et al.

(10) Patent No.: US 8,458,063 B2
(45) Date of Patent: Jun. 4, 2013

(54) SYSTEM AND METHOD FOR PROFILING CONSUMERS AND CREATING A RECOMMENDED OR CUSTOM CARD

(75) Inventors: Rachel Moore, New York, NY (US); Scott Brooks, New York, NY (US); Natalie Azam, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 348 days.

(21) Appl. No.: 11/617,847

(22) Filed: Dec. 29, 2006

(65) Prior Publication Data
US 2008/0162256 A1 Jul. 3, 2008

(51) Int. Cl.
*G06Q 40/00* (2012.01)
*G06Q 40/02* (2006.01)

(52) U.S. Cl.
CPC ............. *G06Q 40/00* (2013.01); *G06Q 40/02* (2013.01); *G06Q 40/025* (2013.01)
USPC .................................. 705/35; 705/38; 705/39

(58) Field of Classification Search
CPC ........ G06Q 40/00; G06Q 40/02; G06Q 40/025
USPC ............................................... 705/35, 38, 39
See application file for complete search history.

(56) References Cited

U.S. PATENT DOCUMENTS

| | | | |
|---|---|---|---|
| 5,351,186 A | 9/1994 | Bullock et al. | |
| 5,611,052 A | 3/1997 | Dykstra et al. | |
| 5,819,263 A | 10/1998 | Bromley et al. | |
| 6,014,645 A | 1/2000 | Cunningham | |
| 6,236,975 B1 | 5/2001 | Boe et al. | |
| 6,430,542 B1 | 8/2002 | Moran | |
| 6,868,525 B1 | 3/2005 | Szabo | |
| 6,904,408 B1 | 6/2005 | McCarthy et al. | |
| 7,318,049 B2 * | 1/2008 | Iannacci | 705/39 |
| 2002/0178113 A1 * | 11/2002 | Clifford et al. | 705/39 |
| 2002/0184075 A1 | 12/2002 | Hertz et al. | |
| 2003/0101131 A1 * | 5/2003 | Warren et al. | 705/38 |
| 2004/0103065 A1 * | 5/2004 | Kishen et al. | 705/64 |
| 2008/0162255 A1 | 7/2008 | Moore et al. | |

OTHER PUBLICATIONS

Information pertaining to http://usa.vsa.com was archived at Nov. 8, 2003 http://web.archive.org/web/20030811171244/www.usa.visa.com/personal/cards/card_benefits.html?it=h2_/personal_index.html and retrieved on Jun. 18, 2008 by way of www.archive.org.*
Information pertaining to http://www.amazon.com was archived at May 9, 2005 http://web.archive.org/web/20050509143420/www.amazon.com/exec/obidos/tg/browse/-/13316081 and retrieved on Jun. 19, 2008 by way of www.archive.org.*
More options for store card novices. (1997). Credit Card Management, 10(4), 84-84. Retrieved Feb. 20, 2013.*

* cited by examiner

*Primary Examiner* — Kito R Robinson
(74) *Attorney, Agent, or Firm* — Snell & Wilmer L.L.P.

(57) ABSTRACT

A system, computer product and method for profiling consumers to recommend a financial transaction instrument having benefits tailored to psychographic characteristics of the consumer. A set of questions is presented to a consumer, in order to determine the psychographic characteristics of the consumer. At least one subset of questions is presented, based on answers to the set of questions, the at least one subset of questions relating more specifically to available benefits. A tailored financial transaction instrument is recommended, having benefits which are based on answers to the at least one subset of questions.

20 Claims, 7 Drawing Sheets

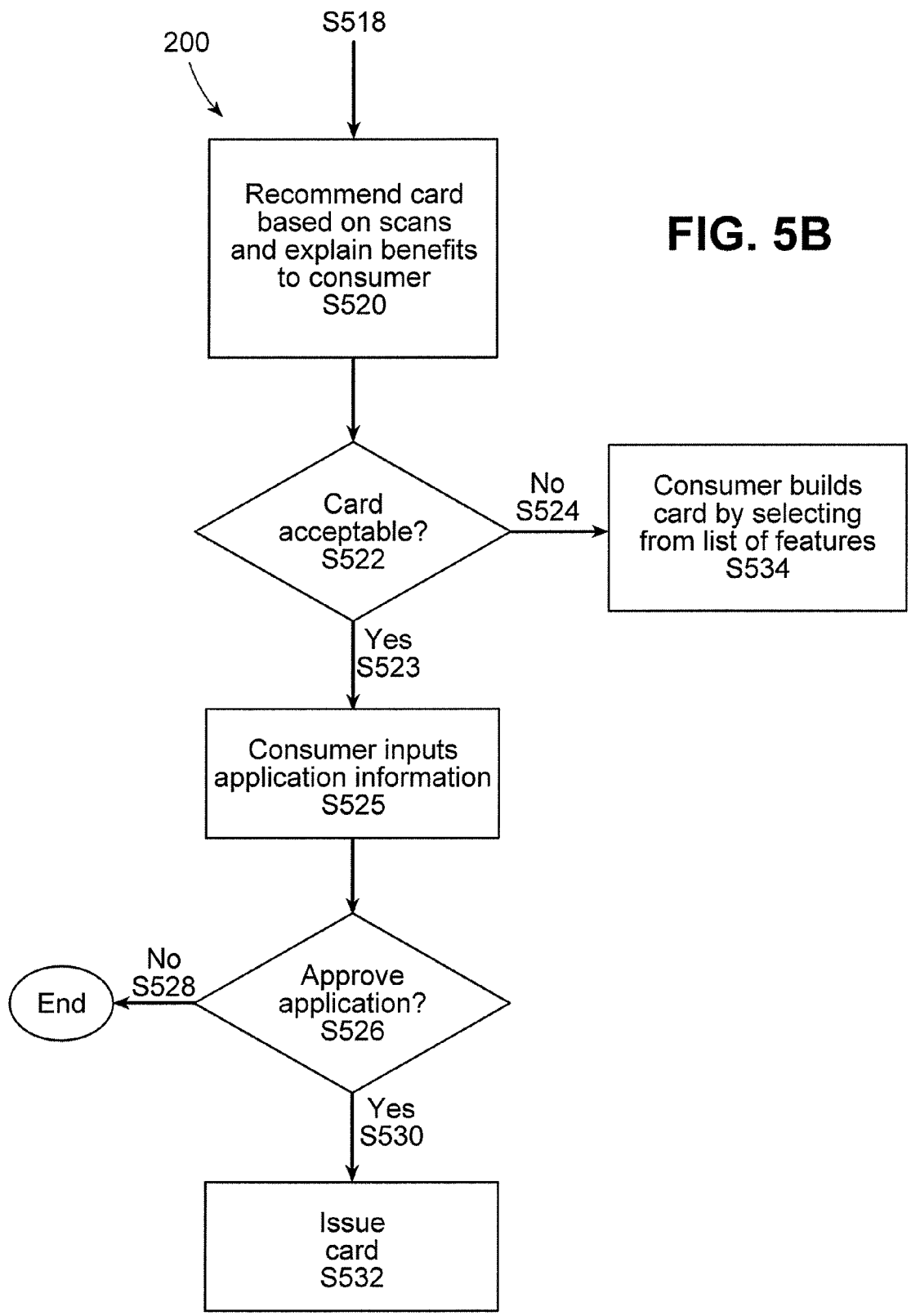

SYSTEM AND METHOD FOR PROFILING CONSUMERS AND CREATING A RECOMMENDED OR CUSTOM CARD

BACKGROUND OF THE INVENTION

1. Field of the Invention

The present invention generally relates to the field of financial transaction instruments, and more particularly to the use of consumer profiling in providing consumers with recommended or custom cards which afford benefits unique to the psychographic characteristics of the consumer.

2. Related Art

Consumers very often use financial transaction instruments as convenient forms of payment for purchases of goods and/or services ("goods/services"). A "financial transaction instrument," also referred to herein as a "card," may be any of the following: a traditional "plastic" transaction card (e.g., a credit card, a charge card, a debit card, a gift card, a pre-paid or stored-value card, or the like); a titanium-containing, or other metal-containing, transaction card; a clear or translucent transaction card; a foldable or otherwise unconventionally-sized transaction card; a radio-frequency-enabled transaction card; or any other type of card used in connection with a financial transaction.

A financial transaction instrument may be configured with electronic functionality. For example, such an instrument can have electronic circuitry that is printed or otherwise incorporated onto or within it (commonly being referred to as a "smart card"), or may be a fob-type device having a transponder and a radio-frequency identification ("RFID") reader. Additionally, a financial transaction instrument may be magnetically encoded with information, such as through use of a magnetic stripe, for example. Optionally, a financial transaction instrument may include a visible card identification number ("CID") uniquely identifying a corresponding transaction account, in case the transaction instrument cannot easily be read electronically or magnetically.

A "transaction account," as used herein, refers to an account associated with an open-account system or a closed-account system, which are discussed in more detail below. A transaction account may exist in a physical or a non-physical embodiment. For example, a transaction account may be distributed in a non-physical embodiment such as an account number, a frequent-flyer account, a telephone calling account, or the like. Furthermore, a physical embodiment of a transaction account may be distributed as a financial transaction instrument.

"Open cards" are financial transaction instruments associated with an open-account system and generally are accepted by different merchants. Examples of open cards include the American Express®, Visa®, MasterCard®, and Discover® cards, which may be used at many different retailers and other businesses. In contrast, "closed cards" are financial transaction instruments associated with a closed-account system and may be restricted to use in a particular store, a particular chain of stores, or a collection of affiliated stores. One example of a closed card is a pre-paid gift card for The Gap®, which typically is purchased at and may only be accepted at The Gap® stores. Note, however, that pre-paid gift cards, also known as stored-value cards, are not limited to closed cards but instead may be open cards issued by, for example, American Express®, Visa®, Discover®, MasterCard®, or the like.

Generally, a merchant that wants to provide customers with the option to pay for goods/services with a particular type of open card will enter into an agreement with the issuer of that type of card (e.g., American Express®, Visa®, Discover®, MasterCard®, or the like). The issuer typically is a financial organization (e.g., American Express®, JPMorgan Chase, MBNA®, Citibank®, or the like) whose card-issuing activities are government regulated.

Because of the wide use of cards by consumers, the types and number of merchants that accept cards has grown and now include, in addition to the more traditional merchants such as stores and restaurants, taxi drivers, doctors, schools, street vendors, on-line vendors, and government agencies, to name a few. Through the use of cards, merchants are able to obtain prompt payment for the purchased goods/services.

Issuers have a financial incentive to contract with as many merchants as possible to accept their cards. Typically, an issuer is paid a so-called "discount rate" by each merchant signed up to accept payment using the issuer's type of card. The discount rate may be, for example, a flat rate paid periodically or a rate based on the merchant's net sales that are paid for using the issuer's type of card.

In order to convince merchants to accept its card, an issuer may provide the merchants with assistance with the set-up process, at no cost to the merchants. The set-up process may include: providing the merchants with point-of-sale ("POS") devices, including hardware and software for reading cards; providing training to employees of the merchants as to how to use the POS devices; providing communication equipment and establishing communication procedures for obtaining quick payment authorizations; and troubleshooting services.

Card issuers typically have a number of different types of financial transaction instruments, e.g. credit cards, available to consumers, containing a wide variety of options for consumers to choose from. While providing a wide variety of options to consumers of course has several advantages, it can nevertheless be difficult or tedious, or even overwhelming, for consumers to sift through a broad array of often complex options in order to find a card that best suits them. Further, consumers may be unsatisfied with their card in that they may not receive benefits from the card that derive from their personal traits (e.g., interests, habits, tastes, and preferences). Accordingly, there is a need for an improved customer profiling process that can make it simpler for consumers to select the card most suited to their personal preferences and relevant traits. Furthermore, there is a need for a psychographic profiling process which can provide consumers with a recommended card, or which can also afford consumers the opportunity to build a custom card, having benefits which are related to the personal interests, habits, tastes, and preferences of the consumer.

BRIEF DESCRIPTION OF THE INVENTION

The present invention meets the above-identified needs by providing a system, method, and computer program product for enabling an issuer of a financial transaction instrument to provide consumers, using a customer profiling process, with a recommended card, or with the opportunity to build a custom card, that affords benefits which are related to the consumer's relevant psychographic characteristics (e.g., interests, habits, tastes, and preferences). The present invention can take into account not only what specific consumers want in a card, but also who they are as people and how they would use their card. In this way, the present invention can take into account psychographic criteria, that is, individual personality traits of a given consumer, such as a consumer's interests, habits, tastes, preferences, and the like. By doing so, the present invention can provide a card that is uniquely and individually suited to the consumer and which affords the user with benefits based on the psychographic profile of the consumer. The present invention can also provide an improved customer profiling process that can make it simpler for a consumer to select the card most suited for him or her.

In accordance with one embodiment of the present invention, there is provided a method for profiling a consumer to recommend a financial transaction instrument having benefits tailored to psychographic characteristics of the consumer. The method includes presenting a set of questions to the consumer in order to determine the psychographic characteristics of the consumer. The method further includes presenting at least one subset of questions based on answers to the set of questions, the at least one subset of questions relating more specifically to available benefits. The method further includes recommending a tailored financial transaction instrument having benefits which are based on answers to the at least one subset of questions.

The method may further include the step of enabling the consumer to custom build a financial transaction instrument through interactive selection of one or more available benefits. The benefits may include earning additional credits or points based on use of the financial transaction instrument in connection with a specific type of purchase. The specific type of purchase may be in a specific genre of goods or services, or made with a specific merchant or merchants, and the points can be used to get discounts from other such purchases. The method may further include the steps of presenting at least one further subset of questions relating more specifically to each available benefit, and recommending additional benefits which are based on answers to the at least one further subset of questions. The method may further include the step of presenting ongoing recommendations to the consumer based on the stored answers.

In accordance with another embodiment of the present invention, there is provided a system for profiling a consumer of a financial network to recommend a financial transaction instrument having benefits tailored to psychographic characteristics of the consumer. The system includes a database storing (1) answers to a set of questions presented to the consumer in order to determine the psychographic characteristics of the consumer, and (2) answers to at least one subset of questions presented to the consumer based on the answers to the set of questions, the at least one subset of questions relating more specifically to available benefits. The system further includes a processor for processing the answers stored in the database and recommending a tailored financial transaction instrument having benefits which are based on the answers to the at least one subset of questions.

The system may also include an interface for interacting with the consumer to present the questions and receive the answers, and the interface may enable the consumer to custom build a financial transaction instrument through interactive selection of one or more available benefits. The benefits may include earning points based on use of the financial transaction instrument in connection with a specific type of purchase. The specific type of purchase may be in a specific genre of goods or services, and may be made with a specific merchant or merchants.

The database may further store at least one further subset of questions relating more specifically to each available benefit, with the processor recommending additional benefits which are based on answers to the at least one further subset of questions.

The processor may also present ongoing recommendations to the consumer based on the stored answers.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIGS. 5A and 5B show a flowchart illustrating a psychographic customer profiling and custom card process according to another embodiment of the present invention.

DETAILED DESCRIPTION

I. Overview

The present invention is directed to a system, method and computer program product for providing a customer profiling process which provides consumers with a financial transaction instrument, usable within a financial network, that is uniquely tailored to their personal interests. The process can take into account personality traits using psychographic criteria such as a consumer's tastes, preferences, shopping habits, personal traits and the like, in order to provide a card that is uniquely suited to the user and which affords the user with desired benefits based on the types of purchases the user makes with the card.

Accordingly, the present invention provides a profiling process that can be psychographic in nature. Based on the consumer's answers to a first level of questions in a questionnaire (for example whether travel or savings is more important to the consumer), a subset of questions can be provided that more specifically hones in on the particular benefits the consumer would like to receive in a card. At the conclusion of the process, a "best suited" card is proposed that can be particularly desirable to the consumer.

If no existing card particularly suits the consumer, or if the consumer is not satisfied with the recommended card, or if the consumer wants another card, the consumer is enabled to create or "custom build" his or her own card by choosing from the various card features and benefits available. The consumer can be presented with the option to custom build his or her own card at any time.

In essence, the psychographic nature of the profiling process of the present invention can provide consumers with a card that relates not only to what consumers want in a card, but to who they are as people. As noted a first level of questioning can ask broadly which feature(s) are more important to the consumer. Based on the response provided, one or more subsets of questions can probe more deeply into the consumer's preferences as reflected in the selected feature(s) to develop a more highly individualized card recommendation.

II. System

The present invention is now described in terms of an exemplary system in which the present invention, in an embodiment, would be implemented. This is for convenience only and is not intended to limit the application of the present invention. It will be apparent to one skilled in the relevant art(s) how to implement the present invention in alternative embodiments.

Figure 1:
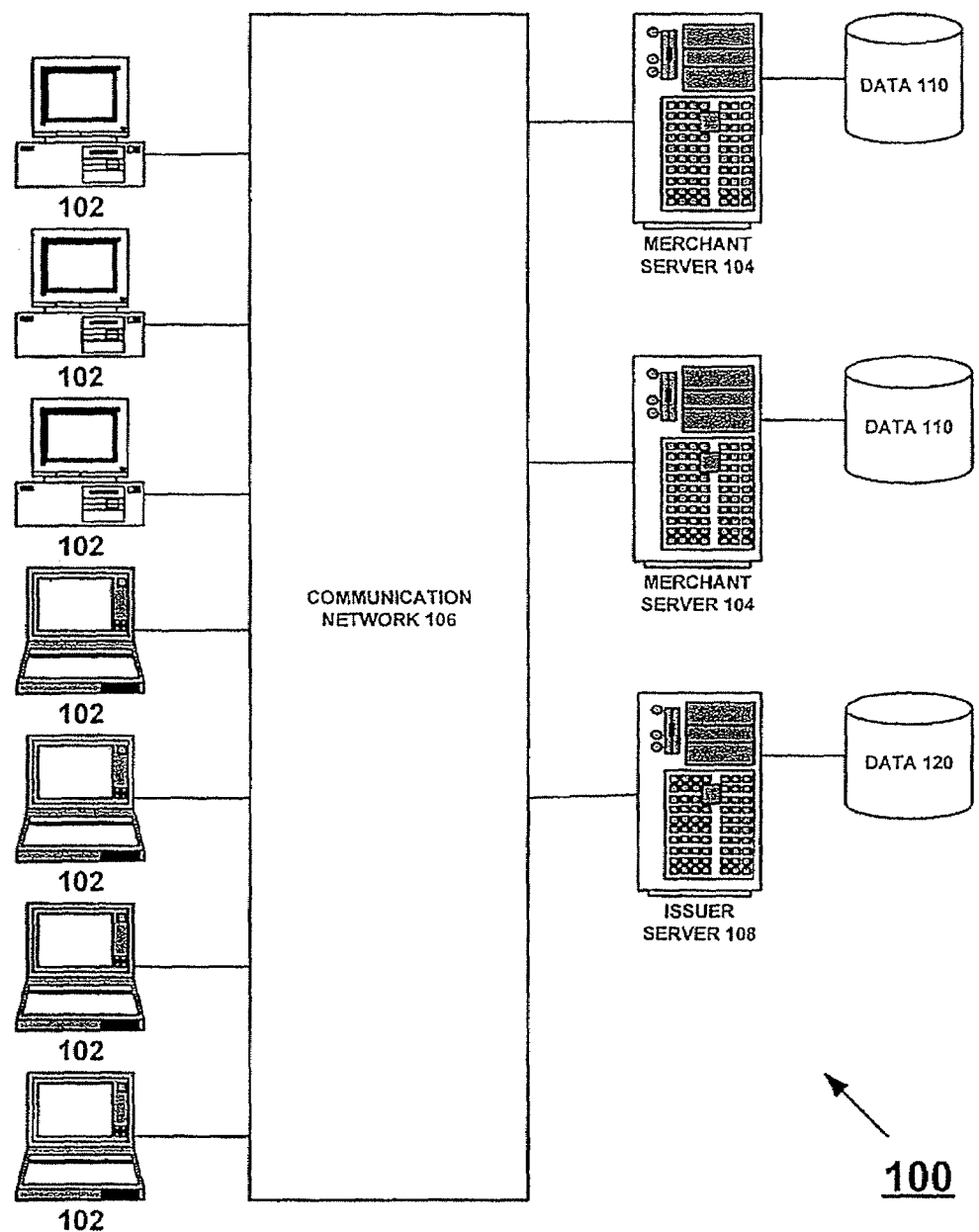
FIG. 1 shows a schematic system diagram of an exemplary profiling and custom card system used to implement or practice one or more embodiments of the present invention.

FIG. 1 shows a schematic system diagram of an exemplary profiling and custom card system 100 used to implement or practice one or more embodiments of the present invention. The system 100 includes at least one consumer communication device 102 configured to communicate with an issuer server 108 via a communication network 106. The issuer server 108 is configured to present the communication device 102 with an interactive Web site ("issuer Web site"). The communication network 106 may be the Internet, a public switched telephone network ("PSTN"), a cellular communication network, a satellite communication network, or any other means of communication between the communication device 102 and the issuer server 108, whether wired or wireless. Preferably, the communication network 106 is the Internet, and the issuer server 108 is configured to communicate with a merchant server 104 via the communication network 106.

The merchant server 104 includes a data storage unit 110, and the issuer server 108 includes a data storage unit 120 configured to store applicant information of consumers who apply for a financial transaction instrument via the issuer Web site.

As shown in FIG. 1, the system 100 may include more than one merchant server 104, each corresponding to a different merchant and/or several corresponding to one merchant.

The present invention is for use with financial transaction instruments including traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid, gift, or stored value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

With regard to use of a transaction account, users may communicate with card issuers or merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

"Merchant" includes any individual, business, entity, customer, hardware and/or software that receives a card number to facilitate a transaction, whether or not in exchange for goods or services. For example, a merchant may be an online bookstore, or a local restaurant.

In general, transaction accounts may be used for transactions between the user and merchant through any suitable communication device, such as, for example, a telephone network, an intranet, the global public Internet, a point of interaction device (e.g., a point of sale (POS) device, personal digital assistant (PDA), mobile telephone, kiosk, etc.), online communications, off-line communications, wireless communications, and/or the like.

An "account," "account number," or "account code", as used herein, may include any device, code, number, letter, symbol, digital certificate, smart chip, digital signal, analog signal, biometric or other identifier/indicia suitably configured to allow a consumer to access, interact with, or communicate with a financial transaction system. The account number may optionally be located on or associated with any financial transaction instrument (e.g., a charge, credit, debit, prepaid, telephone, smart, magnetic stripe, bar code, transponder or radio frequency card). The account number may be distributed and stored in any form of plastic, electronic, magnetic, radio frequency (RF), wireless, audio and/or optical device capable of transmitting or downloading data from itself to a second device.

III. Process

Figure 2A:
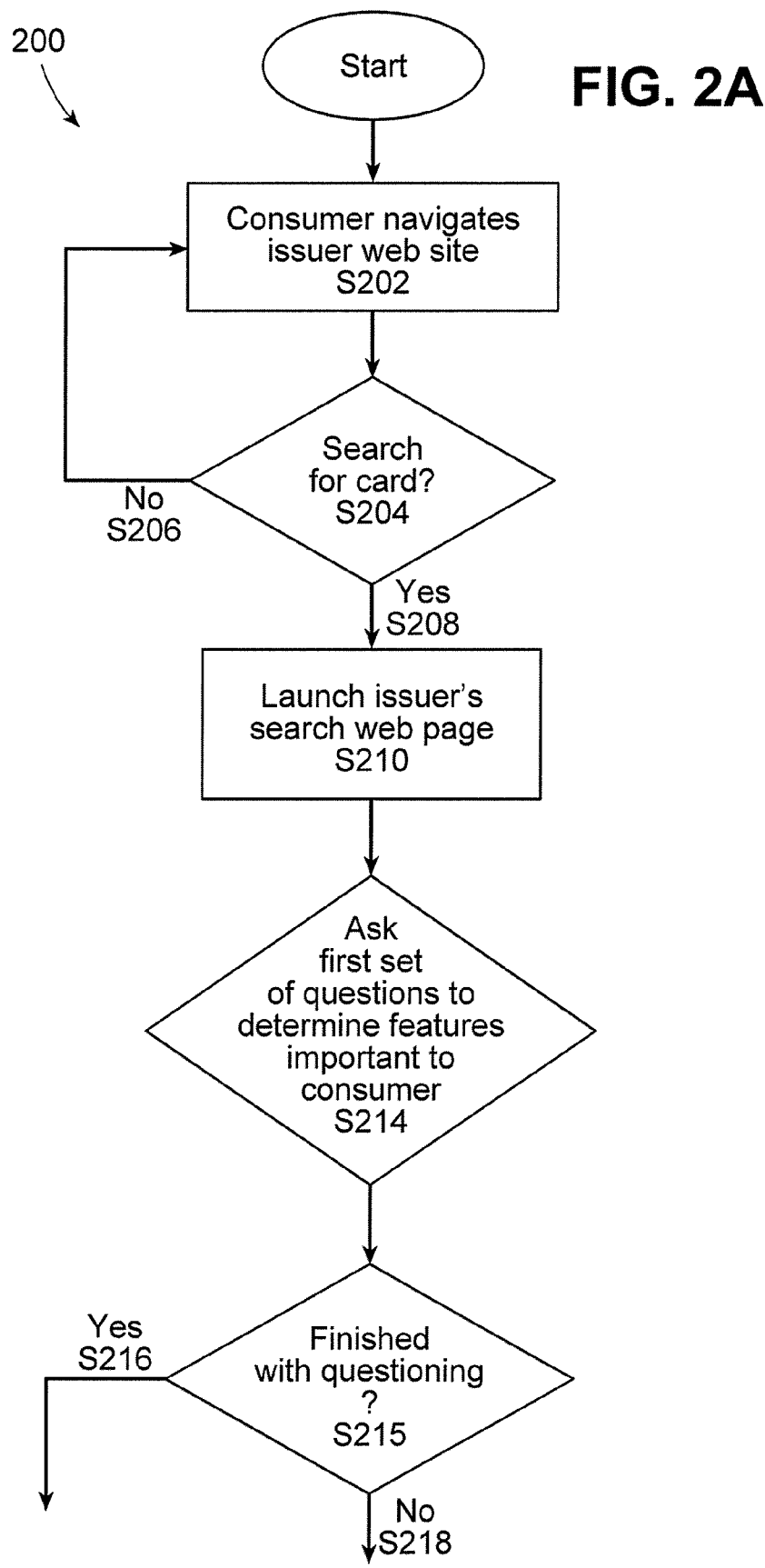
FIGS. 2A and 2B show a flowchart illustrating a psychographic customer profiling and custom card process, according to an embodiment of the present invention.
Figure 2B:
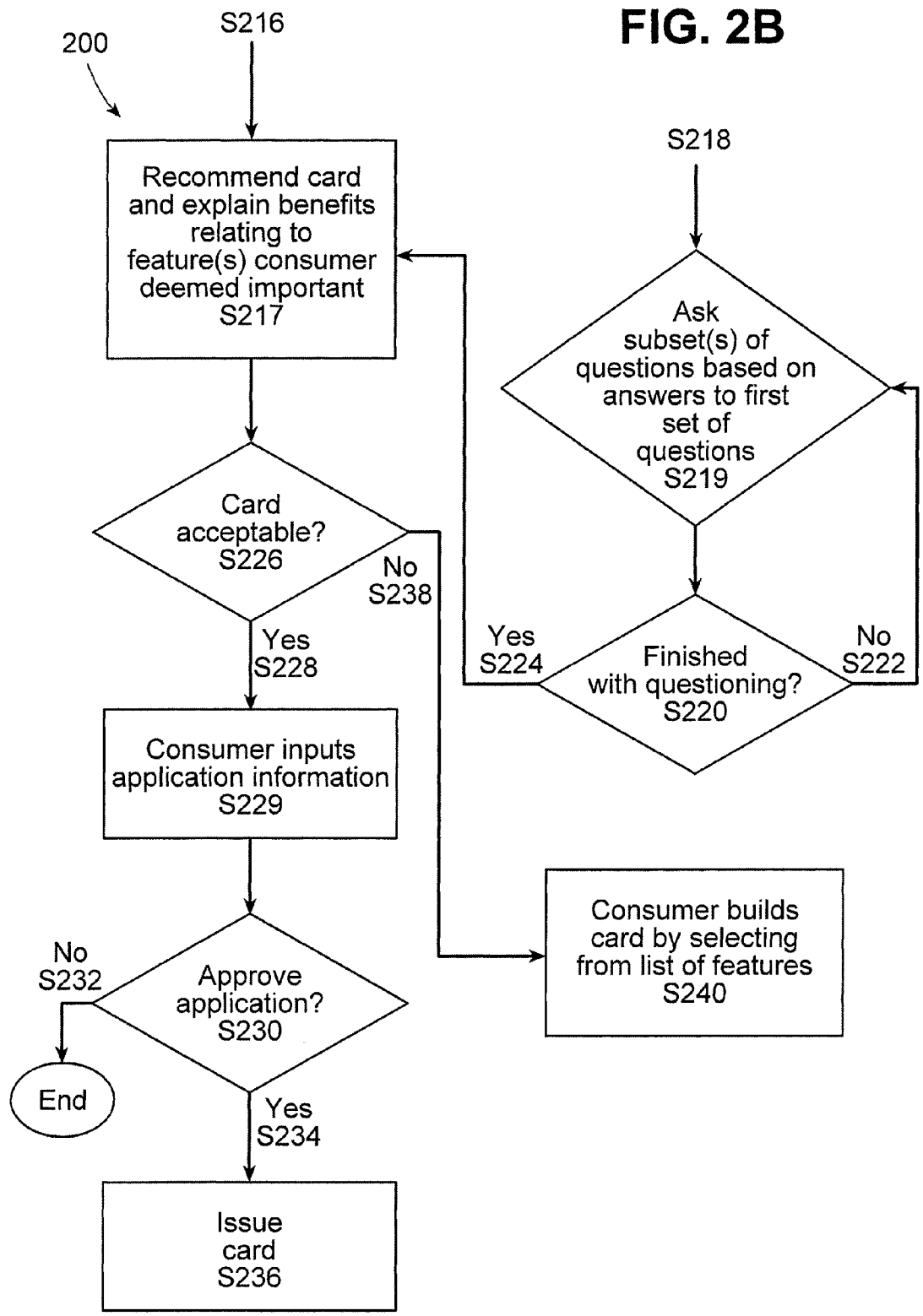

Referring to FIGS. 2A and 2B, a flowchart illustrating a customer profiling and custom card process 200, according to an embodiment of the present invention, is shown. Preferably, the process 200 utilizes the profiling and custom card system 100. The process 200 begins at step S202, at which a consumer uses a communication device 102 to access the issuer server 108 through (for example) a Web site operated or controlled by the issuer.

At Step S204, the consumer decides whether to search for a card. If the consumer chooses not to search for a card, the consumer can continue navigating the issuer website at step S206. If the consumer chooses to search for a card by clicking on the appropriate button in the Web page (Step S208), a search Web page is launched at the issuer site, at Step S210.

At Step S214, the consumer is asked a first set of psychographic questions to determine which of a plurality of card features are most important to him or her. The consumer can be asked to select, for example, one or more features which are important to him, or to rank the listed features in order of importance. These features can include criteria such as whether the consumer is more interested in travel benefits, shopping benefits, dining benefits, etc. Such psychographic criteria is notable in that it gets at the core of who the consumer is in terms of how the consumer spends his or her time. In this way, such questions can include, for example: "Tell us about yourself: Do you like to travel? Do you like to shop?" Or: "Is a low annual fee or a low APR more important to you? Are rewards or services more important to you?"

Another example of psychographic questioning is: "How do you spend your free time? Shopping? Dining? With friends and family? Exercising and wellness? Outdoor activities and adventures? Playing or listening to music?" Still another example is: "Rank the following in order of importance: (A) Saving money and planning for the future; (B) experiencing life and living in the present; (C) taking care of yourself, including your physical and mental health; (D) Having nice things."

Based on the answers given by the consumer in Step S214, the process 200 determines at Step S215 whether the questioning of the consumer is complete. If the questioning is complete (Step S216), flow proceeds to Step S217 at which the process 200 recommends a card based on the consumer's answers as described further below. If a deeper level of questioning is needed (Step S218), the process 200 proceeds to Step S219 in order to ask a subset of questions, based on the previous answers to the questions posed in Step S214, in order to more develop a psychographic profile of the consumer and determine which aspects of the selected features are important to the consumer. The deeper questioning can be designed to, for example, have the consumer rank which aspects of the selected card feature or features are most important to him or her. For example, if the consumer indicated an interest in travel benefits in Step S214, the subset of questions can further explore whether the consumer is more interested in airline rewards or hotel awards. Or if the consumer indicated an interest in rewards in Step S214, more specific questions can be asked to ascertain which rewards types the consumer is interested in. Or, if the consumer indicated an interest in services in Step S214, more specific questions can be asked to ascertain which services.

At this point the method 200 proceeds to step S220 at which it is determined if the questioning is complete. If the questioning is not complete, then Step S222 returns the process 200 to step S219 in order to ask a further subset of questioning based on the answers given by the consumer at S219, until the questioning is complete. Once the questioning is complete, then Step S224 moves the flow to Step S217 at which the process 200 recommends a card based on the consumer's answers.

It is noted that the system preferably always recommends a card; however, it is within the scope of the present invention to set up the system to not recommend a card if it is deemed by the issuer that a "suitable" card cannot be recommended. In this case the consumer can, for example, be prompted to speak with a live operator via a voice link. Additionally, the consumer can have the option to build a custom card as described below.

At step S217, a card is recommended to the consumer and the features of that card are explained. Notably, it is explained to the consumer the benefits which relate to the consumer's interests as represented by the chosen features of the card, and that such benefits can be realized through use of the card. For example, if the consumer indicated travel as being particularly important, the travel features of the card are explained.

The consumer can enjoy, for example, what many call "earn and burn" benefits from use of the card. That is, if the consumer has indicated, for example, that travel benefits are important to him, and, more specifically, hotel rewards, then when the consumer uses the card in connection with a purchase, the card can accumulate credits or points representing discounts and other benefits from various hotels. Or, if the consumer has indicated through his answers to the psychographic questioning that music is a particular interest of his, the card can offer discounts at various music outlets in exchange for use of the card.

The "earn and burn" features can deliver on the "passions" of the consumer by enabling the consumer to accumulate accelerated earn (for example points, cash back, or rebates) in a select category or categories based on purchases in those categories. Such categories include movies, adventure, wellness, music, etc. The consumer can also log on to an interactive issuer Web site to add, remove, and change such features as desired.

In this way, the card issuer can capitalize on the "passions" of a consumer through the consumer's answers to the various psychographic questions. The card issuer can learn how and where a consumer spends his or her money, and the card issuer can provide a category card directed to the consumer's spending habits. In order to fulfill such benefits the issuer can enter into a joint marketing/promotional program with various merchants to promote a financial transaction instrument. It is noted that at Step S217, one card can be recommended, or, alternatively, more than one card option can be presented for the consumer to choose from.

At this point, the process 200 of the present invention proceeds to Step S226 and the consumer is asked if a recommended card is acceptable to him. If the answer is YES (Step S228), then at Step S229, an application Web page is launched at the issuer site and the consumer inputs typical application information, such as name, address, employment information, salary (if desired), etc. At Step S230 the consumer's application is evaluated and the issuer decides whether to approve or deny the application. If the application is denied (Step S232), the consumer is notified of the denial and the process ends. If the application is approved (Step S234), then at Step S236 the card is issued to the consumer.

On the other hand, at Step S226, if a recommended card is not acceptable to the consumer (S238), the consumer will have the opportunity to "build" his or her own card by selecting from a list of available features at Step S240. During the customer build process the consumer will be able to choose whichever special features he or she is interested in. For example, the consumer can choose an awards program (MR, travel, cash back, etc.), can select a rate plan (no fee, low rate, low fixed rate on balance transfers, etc.), and can add special features for additional fees (travel protection, concierge services, insurance plan, special card design, etc.), among others. The consumer can add or change these features at any time (i.e., after the card is issued) by logging on to the issuer Web site, without the need to obtain a new account. After a custom card is built, the flow proceeds to Step S230 to begin the approval process as described.

By virtue of the features of the present invention, customers of the card issuer can be more engaged in the process and have greater control over the selection of their card and in the desirability of the card. The card selection process can be simpler and easier to understand.

Consumer profiles derived from the profiling process can be stored in a database for, among others, possible use at a later time by the card issuer in connection with new products or offers. For example, if a new card is launched which includes features(s) that the consumer might be interested in according to his profile, the card issuer can recommend that product to the consumer. The card issuer can also recommend different products or rewards that the consumer might be interested in. Further, by maintaining an ongoing relationship with the consumer, and by periodically referring to the consumer's profile, the card issuer can monitor whether a consumer's interests or needs are likely to have changed over time, and, accordingly, can offer or recommend to that consumer different rewards or features that he may not have been interested in before. The card issuer can also use the stored data in aggregate to gather information about the marketplace and consumer trends. This would of course be done taking into consideration the applicable privacy concerns involved.

Figure 4:
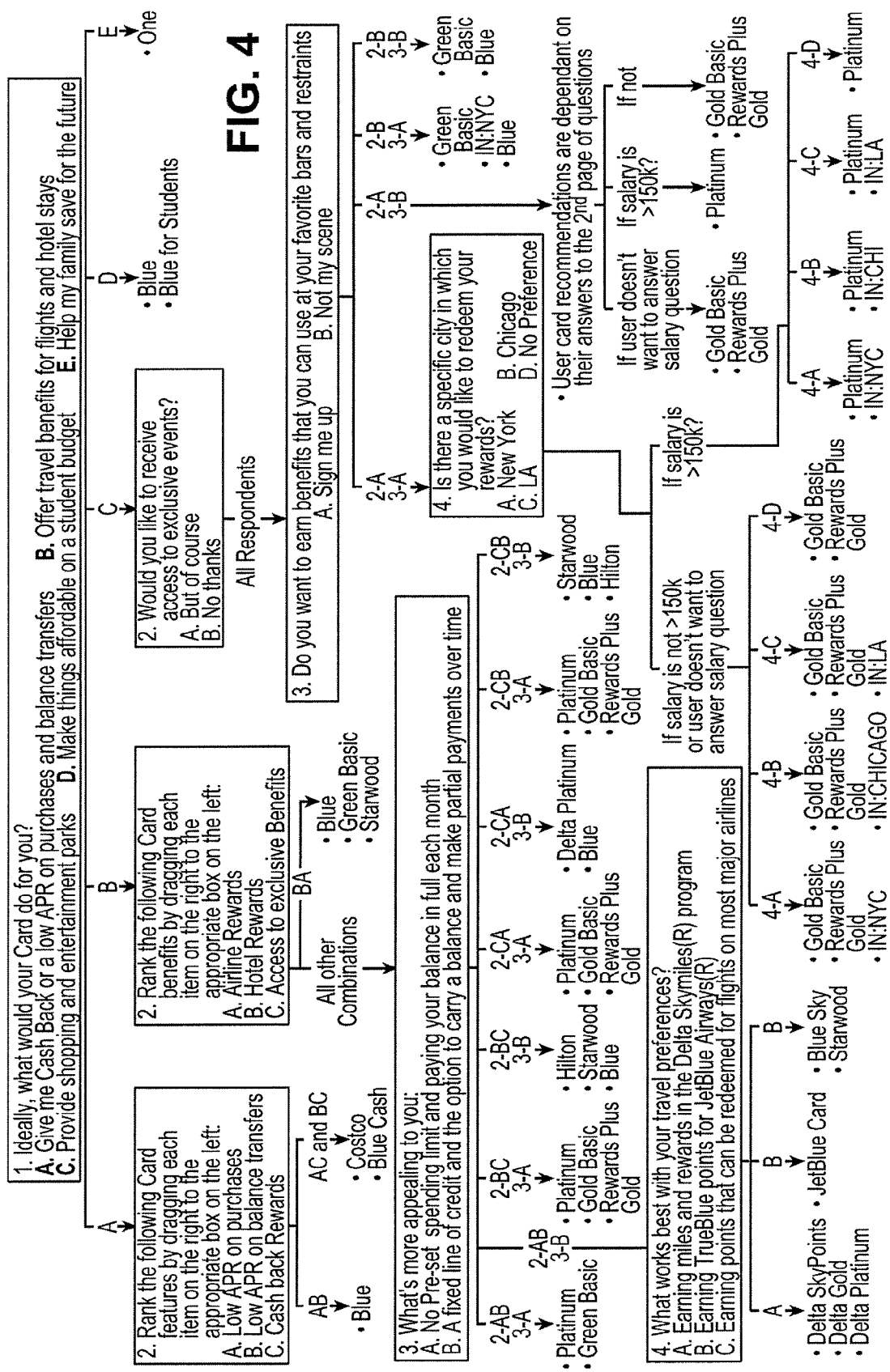
FIG. 4 shows an example of a questionnaire according to one embodiment of the present invention.

FIG. 4 shows an example questionnaire according to one embodiment of the present invention. In Block 1 of FIG. 4, the consumer is asked to choose which of a plurality of card features is most important to him. In particular the consumer is asked what, ideally, his card would do for him. The question is posed in this example in multiple-choice format but, of course, the invention is not limited to the details shown. In any event, the consumer is asked whether ideally his card would (1A) give him cash back or a low APR on purchases and balance transfers, (1B) offer travel benefits for flights and hotel stays, (1C) provide shopping and entertainment perks, (1D) make things affordable on a student budget, or (1E) help his family save for the future.

According to this example, if the consumer chooses either 1D or 1E as most important to him, a card with these features is immediately recommended. On the other hand, if the consumer chooses any of 1A-1C as most important, then various subset(s) of questions are asked to follow up on whichever of 1A-1C the consumer has chosen. For example, in Block 1A2 of the flow, meaning that the consumer has chosen 1A as most important to him, the consumer is asked to rank the card features of (1A2A) low APR on purchases, (1A2B) low APR on balance transfers, or (1A2C) cash back rewards. Based on these answers a card is recommended.

If the consumer chooses 1B or 1C as the most important feature to him, the consumer is then asked subsets of questions to more specifically center in on what benefits the consumer would most enjoy in his card. Relevant benefits can relate to (for example and depending on which features the consumer has chosen as most important) airline miles, hotel points, location, entertainment perks, and the like. Based on the consumer's answers to these questions, a card is recommended at various stages in the flow. The recommended card may be based on a specific merchant or merchants into which a joint marketing/promotional program has been entered.

Of course, FIG. 4 represents one example and is not meant to be limiting. The benefits presented are merely examples, as are the questions shown in the figure. Further, the recommendation can be based on one feature which is most important to a consumer or on more than one feature. The recommendation can relate to benefits received from the issuer (e.g., a low APR), from one or more merchants (e.g., cash back on purchases), or to all of these. Moreover, while the invention is described in one embodiment in terms of implementation using an issuer Web site, the invention is of course not limited thereto.

Figure 5A:
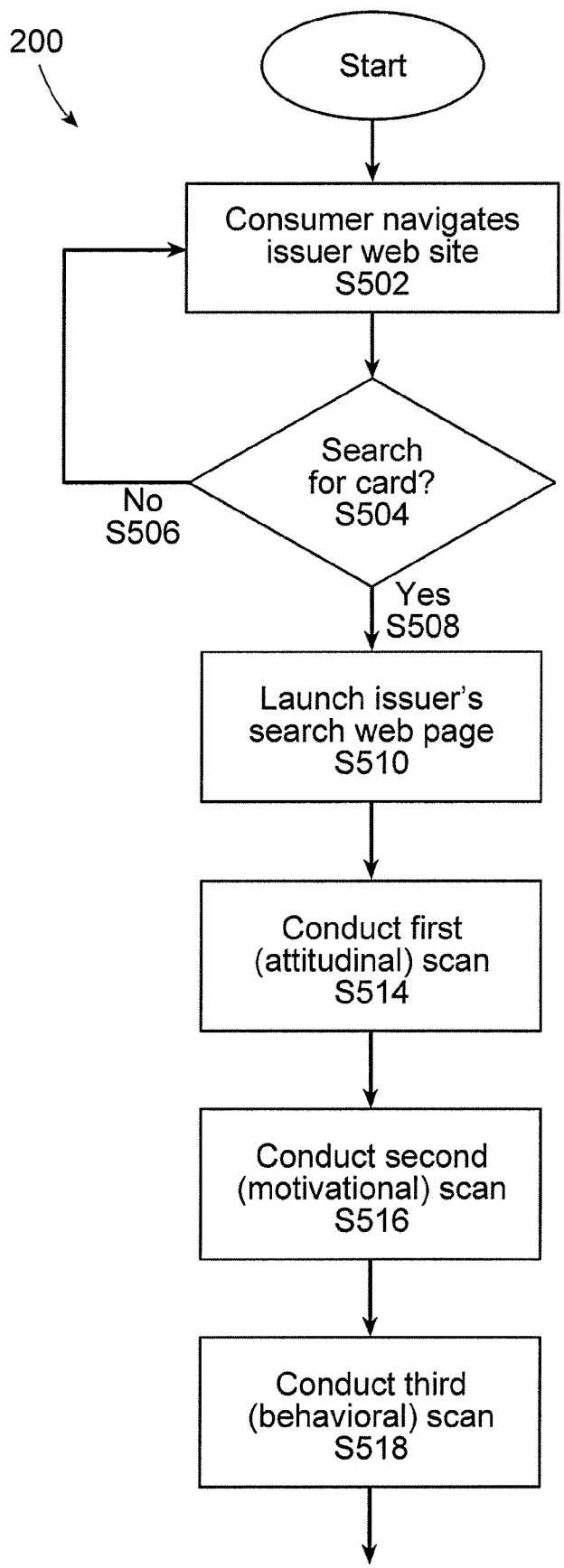

Referring to FIGS. 5A and 5B, a flowchart illustrating a psychographic customer profiling and custom card process 200, according to another embodiment of the present invention, is shown. Preferably, the process 200 utilizes the profiling and custom card system 100. The process is in the form of an interview/survey format so that consumers can be better connected and engaged. At Step S502, a consumer uses a communication device 102 to access the issuer server 108 through (for example) a Web site operated or controlled by the issuer.

At Step S504, the consumer decides whether to search for a card. If the consumer chooses not to search for a card, the consumer can continue navigating the issuer website at step S506. If the consumer chooses to search for a card by clicking on the appropriate button in the Web page (Step S508), a search Web page is launched at the issuer site, at Step S510.

At Step S514 a first scan, in this embodiment an attitudinal scan, is performed. In this scan, the consumer is asked one or more questions designed to ascertain how the consumer spends his or her free time. For example, "What do you do in your free time?" Or: "If you would buy your friend a gift, what type of gift would it likely be: (A) spa certificate, (B) book, (C) art?" Or: "What is your favorite hobby? Why?"

Once the attitudinal scan is complete, the process 200 moves to a motivational scan at Step S516, a second scan in which the consumer is asked one or more questions which are based on the answers given in the attitudinal scan and are designed to ascertain why the consumer is motivated to spend his or free time in the manner indicated. For example: "Why do you choose to spend your free time this way? (A) Family, (B) Kids, (C) School." Or: "What feelings do you get from spending your time this way? (A) Joy, (B) Relief, (C) Excitement." The questions are designed to establish a profile of the consumer which can be useful in recommending a card that particularly suits the consumer.

Once the motivational scan is complete, the process 200 moves to a behavioral scan at Step S518, a third scan in which the consumer is asked one or more questions which are based on the answers given in the previous two scans and are designed to ascertain more specifically what the needs, habits, tastes, or preferences of the consumer are. For example, if the consumer has indicated an interest in home furnishings, which home furnishings stores the consumer typically shops at. As another example, if the consumer indicates an interest in travel in the attitudinal scan: "Which airline do you most frequently travel on?" Or, as another example: "Do you have a specific need for a credit card?" Or: "Rank the following in order of importance."

It is of course to be understood that while three scans are shown above, the present invention is not limited to that number, and any number of scans—and any number of questions per scan—can be presented. As an example, if there are three scans and each scan has five questions, then there would be 125 unique message combinations specifically targeted to the type of individual responding. Based on these unique messages, a profile can be created.

At Step S520 a card is recommended to the consumer based on the questioning process, and the features of the card are explained to the consumer. Notably, it is explained to the consumer the benefits which relate to the consumer's interests as represented by the chosen features of the card, and that such benefits can be realized through use of the card. For example, if the consumer indicated dining out as being particularly important, the dining-out features of the card are explained.

The consumer can enjoy "earn and burn" benefits from use of the card, as described previously. It is noted that at Step S520, one card can be recommended, or, alternatively, more than one card option can be presented for the consumer to choose from.

At this point, the process 200 of the present invention proceeds to Step S522 and the consumer is asked if a recommended card is acceptable to him. If the answer is YES (Step S524), then at Step S525, an application Web page is launched at the issuer site and the consumer inputs typical application information, such as name, address, employment information, salary (if desired), etc. At Step S526 the consumer's application is evaluated and the issuer decides whether to approve or deny the application. If the application is denied, at Step S528, the consumer is notified of the denial and the process ends. If the application is approved (Step S530), then at Step S532 the card is issued to the consumer.

On the other hand, at Step S522, if a recommended card is not acceptable to the consumer (S524), the consumer will have the opportunity to "build" his or her own card by selecting from a list of available features at Step S534. During the customer build process the consumer will be able to choose whichever special features he or she is interested in. The consumer can add or change these features at any time (i.e. after the card is issued) by logging on to the issuer Web site, without the need to obtain a new account. After a custom card is built, the flow proceeds to Step S526 to begin the approval process as described.

IV. Example Implementation

The present invention (i.e., system 100, the customer profiling and custom card process 200 or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

Figure 3:
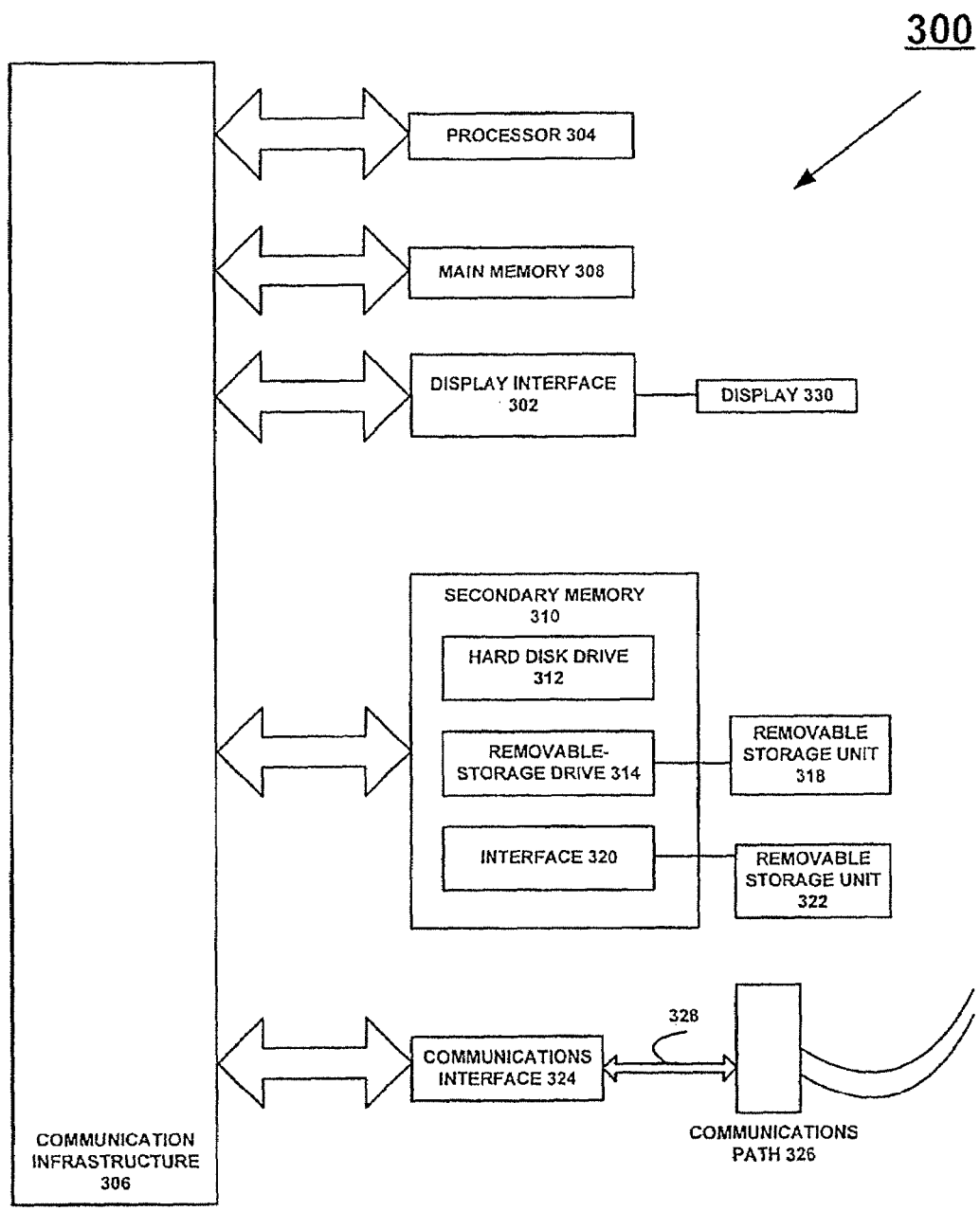
FIG. 3 shows a block diagram of an exemplary computer system useful for implementing the present invention.

In fact, in one embodiment, the present invention is directed toward one or more computer systems equipped to carry out the functions described herein. An example of such a computer system 300 is shown in FIG. 3.

The computer system 300 includes at least one processor 304. The processor 304 is connected to a communication infrastructure 306 (e.g., a communications bus, a cross-over bar device, or a network). Although various software embodiments are described herein in terms of this exemplary computer system 300, after reading this description, it will become apparent to a person skilled in the relevant art(s) how to implement the invention using other computer systems and/or architectures.

The computer system 300 includes a display interface 302 that forwards graphics, text, and other data from the communication infrastructure 306 (or from a frame buffer (not shown)) for display on a display unit 330.

The computer system 300 also includes a main memory 308, which preferably is a random access memory (RAM), and may also include a secondary memory 310. The secondary memory 310 may include, for example, a hard disk drive 312 and/or a removable-storage drive 314 (e.g., a floppy disk drive, a magnetic tape drive, an optical disk drive, and the like). The removable-storage drive 314 reads from and/or writes to a removable storage unit 318 in a well-known manner. The removable storage unit 318 may be, for example, a floppy disk, a magnetic tape, an optical disk, and the like, which is written to and read by the removable-storage drive 314. As will be appreciated, the removable storage unit 318 includes a computer-usable storage medium having stored therein computer software and/or data.

In alternative embodiments, the secondary memory 310 may include other similar devices for allowing computer programs or other instructions to be loaded into the computer system 300. Such devices may include a removable storage unit 322 and an interface 320 (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 322 and interfaces 320 that allow software and data to be transferred from the removable storage unit 322 to the computer system 300.

The computer system 300 may also include a communications interface 324, which allows software and data to be transferred between the computer system 300 and external devices (not shown). Examples of the communications interface 324 may include a modem, a network interface (e.g., an Ethernet card), a communications port, a Personal Computer Memory Card International Association ("PCMCIA") interface, and the like. Software and data transferred via the communications interface 324 are in the form of signals 328, which may be electronic, electromagnetic, optical or another type of signal that is capable of being received by the communications interface 324. These signals 328 are provided to the communications interface 324 via a communications path 326 (e.g., a channel). The communications path 326 carries the signals 328 and may be implemented using wire or cable, fiber optics, a telephone line, a cellular link, a radio-frequency ("RF") link, or the like.

As used herein, the phrases "computer program medium" and "computer usable medium" may be used to generally refer to a removable storage unit 318 used with the removable-storage drive 314, a hard disk installed in the hard disk drive 312, or and the signals 328, for example. These computer program products provide software to the computer system 300. The present invention may be implemented or embodied as one or more of such computer program products.

Computer programs (also referred to as computer control logic) are stored in the main memory 308 and/or the secondary memory 310. The computer programs may also be received via the communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the present invention is implemented using software, the software may be stored in a computer program product and loaded into the computer system 300 using the removable-storage drive 314, the hard drive 312, or the communications interface 324. The control logic (software), when executed by the processor 304, causes the processor 304 to perform the functions of the present invention as described herein.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s).

In yet another embodiment, the present invention is implemented using a combination of both hardware and software.

V. Conclusion

The various embodiments of the present invention described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A method to recommend a new financial transaction account having benefits tailored to psychographic characteristics, the method comprising:

presenting, by a computer-based system for recommending the new financial transaction account, a first psychographic profile question, wherein a psychographic profile question is at least one of a consumer interest question, a consumer habit question, a consumer taste question, and a consumer preference question;

determining, by the computer-based system, whether an additional psychographic profile question is needed to establish a psychographic profile;

establishing, by the computer-based system, the psychographic profile based on the psychographic profile questioning;

presenting, by the computer-based system and in response to the established psychographic profile, a customized subset of benefit questions, wherein the customization of the benefit questions is based on the established psychographic profile, and wherein a benefit question of the customized subset of benefit questions relates to specific transaction account benefits available;

identifying, by the computer-based system and in response to the response to the customized benefit question, an identified financial transaction account;

displaying, by the computer-based system and on an interface, information describing the identified financial transaction account, wherein the information explains the benefit relating to an interest based on the established psychographic profile enabling the building of a new financial transaction account through interactive selection of available benefits;

issuing, by the computer based system, a selected issued financial transaction account;

tracking, by the computer based system, use of the issued financial transaction account;

identifying, by the computer based system, a promotional program with a merchant based on the tracking; and offering, by the computer based system, updated features to the issued financial transaction account associated with the promotional program from the merchant.

2. The method as set forth in claim 1, wherein the benefits include earning points based on use of the identified financial transaction account in connection with a specific type of purchase.

3. The method as set forth in claim 2, wherein the specific type of purchase is in a specific genre of goods or services.

4. The method as set forth in claim 3, wherein the specific type of purchase is made with a specific merchant or merchants.

5. The method as set forth in claim 1, further comprising presenting, by the computer-based system, a further subset of benefit questions relating more specifically to each available benefit, and recommending, by the computer-based system, additional benefits which are based on answers to the further subset of benefit questions.

6. A system for recommending a new financial transaction account having benefits tailored to psychographic characteristics, comprising:
  a database storing:
    features associated with a financial transaction account,
    a selection to a first psychographic profile question, wherein a psychographic profile is established based on the response provided to the psychographic profile questioning and
    a response to a customized benefit question, wherein the benefit question is customized and presented in response to the established psychographic profile, wherein a benefit question relates to specific transaction account benefits available;
  a processor for identifying, in response to the response to the customized benefit question, an identified financial transaction account; and
  an interface for displaying information describing the identified financial transaction account, wherein the information explains a benefit relating an interest based on the psychographic profile response and the interface presents the first psychographic profile question and the benefit question, and receives the first psychographic profile and the benefit responses;
issuing, by the computer based system, a selected identified financial transaction account;

tracking, by the computer based system, use of the issued financial transaction account;

identifying, by the computer based system, a promotional program with a merchant based on the tracking; and offering, by the computer based system, updated features to the issued financial transaction account associated with the promotional program from the merchant.

7. The system as set forth in claim 6, wherein the interface enables the building of a custom financial transaction account through interactive selection of available benefits.

8. The system as set forth in claim 6, wherein the benefits include earning points based on use of the financial transaction account in connection with a specific type of purchase.

9. The system as set forth in claim 8, wherein the specific type of purchase is in a specific genre of goods or services.

10. The system as set forth in claim 9, wherein the specific type of purchase is made with a specific merchant or merchants.

11. The system as set forth in claim 6, wherein the database further stores a further subset of benefit questions relating more specifically to each available benefit, and the processor recommends additional benefits which are based on answers to the at least one further subset of benefit questions.

12. The system as set forth in claim 8, wherein the processor presents ongoing recommendations based on the stored responses to the benefit questioning and the psychographic profile questioning.

13. The method as set forth in claim 1, further comprising presenting ongoing recommendations based on the responses to the benefit questioning and the psychographic profile questioning.

14. A non-transitory computer-readable storage medium having stored thereon sequences of instruction, the sequences of instruction including instruction which, when executed by a computer based system for recommending a new financial transaction account, causes the computer based system to perform operations comprising:
  presenting, by the computer based system, a first psychographic profile question, wherein a psychographic profile question is at least one of a consumer interest question, a consumer habit question, a consumer taste question, and a consumer preference question;
  determining, by the computer based system, whether an additional psychographic profile question is needed to establish a psychographic profile;
  establishing, by the computer based system, the psychographic profile based on the psychographic profile questioning;
  presenting, by the computer based system and in response to the established psychographic profile, a customized subset of benefit questions, wherein the customization of the benefit questions is based on the established psychographic profile, and wherein a benefit question of the customized subset of benefit questions relates to specific transaction account benefits available;
  identifying, by the computer based system, in response to the response to the customized benefit question, an identified financial transaction account; and
  displaying, by the computer based system and on an interface, information describing the identified financial transaction account, wherein the information explains the benefit relating to an interest based on the established psychographic profile;
  building, by the computer based system, a new financial transaction account through interactive selection of available benefits;

issuing, by the computer based system, a selected identified financial transaction account; tracking, by the computer based system, use of the issued financial transaction account;

identifying, by the computer based system, a promotional program with a merchant based on the tracking; and offering, by the computer based system, updated features to the issued financial transaction account associated with the promotional program from the merchant.

15. The medium of claim 14, wherein the benefits include earning points based on use of the financial transaction account in connection with a specific type of purchase.

16. The medium of claim 15, wherein the specific type of purchase is in a specific genre of goods or services.

17. The medium of claim 16, wherein the specific type of purchase is made with a specific merchant or merchants.

18. The medium of claim 14, further comprising the steps of presenting, by the computer based system, a further subset of questions relating more specifically to each available benefit, and recommending, by the computer based system, additional benefits which are based on answers to the further subset of benefit questions.

19. The medium of claim 14, further comprising presenting, by the computer-based system, an additional psychographic profile question until a determination is made that sufficient information has been collected to establish the psychographic profile.

20. The method as set forth in claim 1, further comprising presenting, by the computer-based system, an additional psychographic profile question until a determination is made that sufficient information has been collected to establish the psychographic profile.

\* \* \* \* \*